G. M. EATON AND R. E. HELLMUND.
LOCOMOTIVE.
APPLICATION FILED DEC. 14, 1916.

1,318,736.

Patented Oct. 14, 1919.
2 SHEETS—SHEET 1.

WITNESSES:

INVENTOR
George M. Eaton &
Rudolph E. Hellmund.
BY
ATTORNEY

G. M. EATON AND R. E. HELLMUND.
LOCOMOTIVE.
APPLICATION FILED DEC. 14, 1916.
1,318,736.
Patented Oct. 14, 1919.
2 SHEETS—SHEET 2.
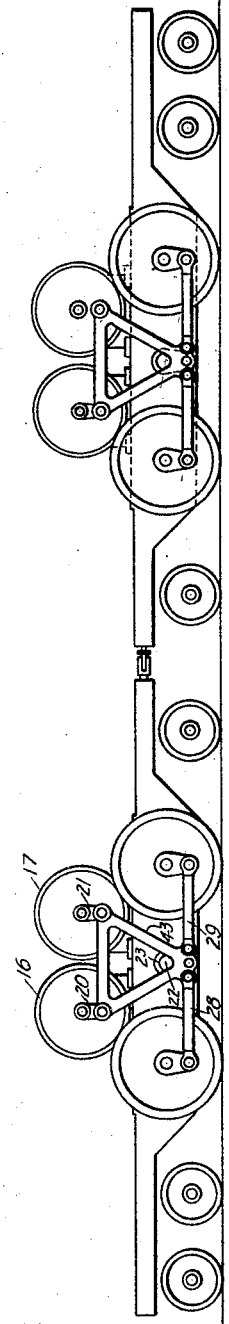
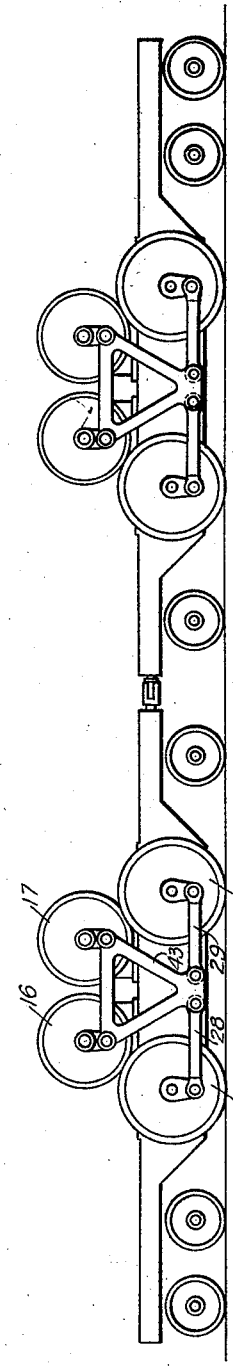
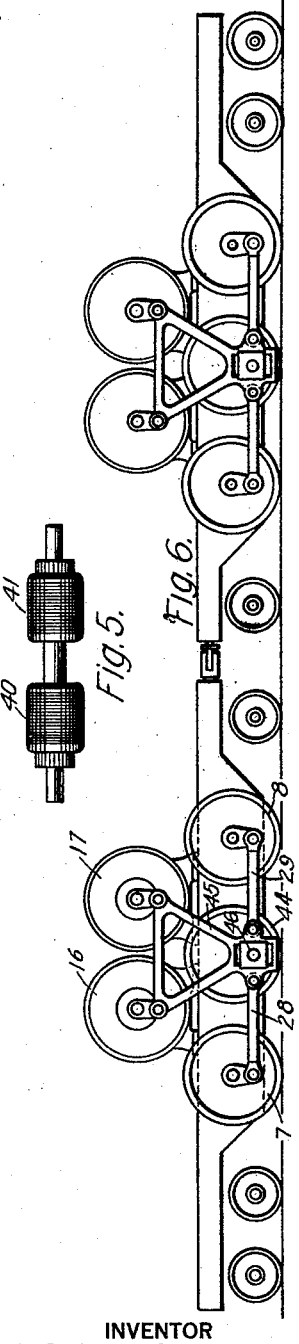
WITNESSES:
Fred C. Williams
W. B. Wells
INVENTOR
George M. Eaton &
Rudolph E. Hellmund.
BY
Wesley G. Carr
ATTORNEY

UNITED STATES PATENT OFFICE.

GEORGE M. EATON, OF PITTSBURGH, AND RUDOLF E. HELLMUND, OF SWISSVALE, PENNSYLVANIA, ASSIGNORS TO WESTINGHOUSE ELECTRIC AND MANUFACTURING COMPANY, A CORPORATION OF PENNSYLVANIA.

LOCOMOTIVE.

1,318,736.  Specification of Letters Patent.  Patented Oct. 14, 1919.

Application filed December 14, 1916. Serial No. 136,877.

*To all whom it may concern:*

Be it known that we, GEORGE M. EATON, a citizen of the United States, and a resident of Pittsburgh, in the county of Allegheny and State of Pennsylvania, and RUDOLF E. HELLMUND, a subject of the German Emperor, and a resident of Swissvale, in the county of Allegheny and State of Pennsylvania, have invented a new and useful Improvement in Locomotives, of which the following is a specification.

Our invention relates to locomotives and particularly to electric locomotives having rod connecting means between the propelling motors and the driving wheels.

One object of our invention is to provide a locomotive that shall be provided with guiding trucks and driving wheels so disposed as to insure good running and tracking qualities and motors so disposed relative to the driving wheels as to insure a high speed and a powerful driving torque.

Another object of our invention is to provide a locomotive of the above-indicated character that shall be provided with motors, having tandem-mounted armatures, which are disposed substantially over the driving wheels and are connected by rods, the center lines of which intersect at a common point on the center line of the side rods which connect the various driving wheels together.

A further object of our invention is to provide a locomotive of the above-indicated character that shall be provided with a rod connection between the propelling motors and the driving wheels, which shall be light and simple in structure and substantially free from lateral vibrations and from extreme whipping stresses.

More specifically, our invention embodies a locomotive having a cab and two articulated running gears. Each of the running gears embodies an outer and an inner guiding truck, and a number of pairs of driving wheels disposed between the two guiding trucks. The driving wheels are interconnected by side rods, and, centrally located above the driving wheels, are two motors which are connected by rods to a central point on the side-rod system which connects the various driving wheels.

Figure 1:
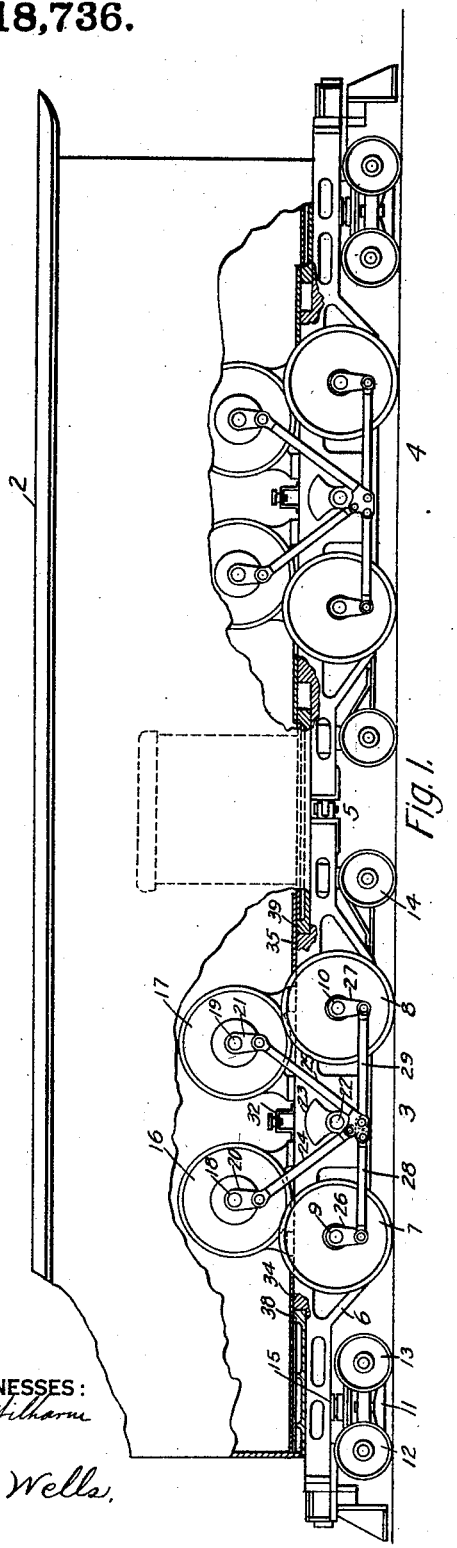
Figure 2:
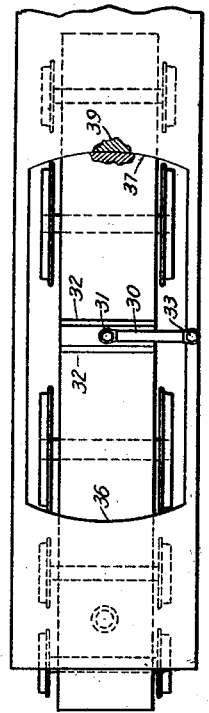

In the accompanying drawings, Figure 1 is an elevational view, partially in section, of a locomotive constructed in accordance with our invention; Fig. 2 is a detail view illustrating the connecting means between the cab and the running gears of the locomotive illustrated in Fig. 1; Figs. 3 and 4 are views of portions of the locomotive illustrated in Fig. 1, and illustrate various rod connecting means between the propelling motors and the driving wheels; Fig. 5 is a detail view of the armature structure for the propelling motors; and Fig. 6 is an elevational view of a modification of a portion of the locomotive illustrated in Fig. 1.

Referring to Figs. 1 and 2 of the drawings, a locomotive 1 embodies a cab 2 and two running gears 3 and 4, which are connected together by an articulated connection 5.

The running gears 3 and 4 are similar in construction, with one exception which is pointed out in detail later, and, accordingly, only one running gear, namely, the running gear 3, will be described in detail. The running gear 3 embodies side frames 6, two pairs of driving wheels 7 and 8, which are mounted on driving axles 9 and 10, a pivotal guiding truck 11 having two pairs of wheels 12 and 13, and a two-wheel radial truck 14. The driving wheels 7 and 8 have a rigid wheel base, and the guiding truck 11, comprising the pairs of wheels 12 and 13, is connected to the side frames 6 by means of a pivotal connection 15.

Two motors 16 and 17, having armature shafts 18 and 19 and crank disks 20 and 21 mounted thereon, are mounted on the side frames 6 of the running gear 3 substantially over the driving wheels 7 and 8. A jack shaft 22, having crank disks 23 mounted thereon, is disposed between the two pairs of driving wheels 7 and 8. The crank disks 23 on the jack shaft 22 are connected to the crank disks 20 and 21 of the motors 16 and 17 by side rods 24 and 25, respectively. The crank disks 23 are also connected to driving cranks 26 and 27, which are respectively mounted on the driving axles 9 and 10, by means of the side rods 28 and 29.

The means for connecting the running gear 3 to the cab 2 embodies a link 30, having a pivotal connection 31 to a body bolster 32 of the running gear, and a pivotal connection 33 to the frame of the cab 2. The link 30 permits the running gear 3 to effect a movement of rotation relative to the cab 2 but restrains the same from any lateral movement relative thereto. Intermediate the ends of the running gear 3 and adjacent to the motors 16 and 17 are body bolsters 34 and 35, which have cylindrical surfaces 36 and 37 that have a center in the vertical central axis of the running gear. Coöperating with the cylindrical surfaces 36 and 37 are substantially-concentric surfaces 38 and 39 on the frame of the cab 2, which permit the running gear 3 to have a movement of rotation relative to the cab but prevent the same from having any longitudinal movement relative thereto.

The running gear 4 differs from the running gear 3 in that the cylindrical surfaces 36 and 37 on the running gear and the surfaces 38 and 39 on the cab are not in engagement with each other. A space is left between the above-mentioned surfaces on the running gear and on the cab, so that, in case the articulated connection between the two running gears develops any lost motion, the torque developed by the locomotive will, in no case, be transmitted through the cab structure.

The connecting means between the cab and each running gear, which permits each running gear to have a movement of rotation, relative to the cab, about a center located substantially at the vertical central plane of the locomotive by means located substantially outside the vertical central plane of the locomotive, is completely disclosed and illustrated in an application filed by G. M. Eaton, Serial No. 132091, filed Nov. 18, 1916, and assigned to the Westinghouse Electric & Manufacturing Company.

Each of the armature shafts 18 and 19 is provided with two tandem-mounted armatures 40 and 41, as illustrated in Fig. 5 of the drawings.

In Fig. 3 of the drawings, triangular-shaped connecting members 43 are provided for connecting the crank disks 20 and 21 of the motors 16 and 17 to the crank disks 23, which are mounted on the jack shaft 22. The jack shaft 22, which is illustrated in Figs. 1 and 3, is essentially designed to prevent any lateral vibration and to have a steadying effect on the rods connected to the driving wheels 7 and 8 and the motors 16 and 17.

In Fig. 4 of the drawings, the triangular-shaped connecting members 43 are directly connected to the side rods 28 and 29, which connect the driving wheels 7 and 8, without the interposition of the jack shaft 22 and the crank disks 23, which are mounted thereon.

In Fig. 6 of the drawings, the jack shaft 22 is replaced by a pair of driving wheels 44, and side rods 28 and 29, which are connected to the driving wheels 7 and 8, are pinned to a triangular-shaped member 45 which is connected to the driving wheels 44 by means of a scotch yoke 46.

Variations in the structure and arrangement and location of parts may be made without departing from the spirit and scope of our invention, and such modifications are intended to be covered in the appended claims.

We claim as our invention:

1. In a locomotive, the combination with a cab, of two articulated running gears pivotally associated with said cab, each of said running gears comprising driving wheels and a two-wheel and a four-wheel truck having wheels of a less diameter than said driving wheels.

2. In a locomotive, the combination with a cab, of two articulated running gears, each of said running gears comprising driving wheels mounted thereon, and a two-wheel and a four-wheel guiding truck mounted adjacent to said driving wheels.

3. In a locomotive, the combination with a single cab, of two articulated running gears pivotally connected thereto, each of said running gears comprising a radial and a pivotal guiding truck disposed at the respective ends of each running gear, and driving wheels disposed between said guiding trucks.

4. In a locomotive, the combination with two articulated running gears each comprising a two-wheel radial and a four-wheel pivotal truck disposed at the respective ends of each running gear, of a single cab supported by said running gears, and pairs of driving wheels disposed between said trucks.

5. In a locomotive, the combination of two articulated running gears, each comprising a two-wheel radial and a four-wheel pivotal truck disposed at the respective ends of each running gear, pairs of driving wheels disposed between said trucks, said guiding trucks having wheels of a smaller diameter than said driving wheels, and a single cab supported by said running gears.

6. In a locomotive, the combination with a cab, of two articulated running gears for supporting said cab, each of said running gears comprising a pivotal and a radial truck disposed at the respective ends of each running gear, and two pairs of driving wheels disposed between said two trucks.

7. In a locomotive, the combination with a cab, of two articulated running gears for supporting said cab, each of said running gears comprising a four-wheel outer pivotal guiding truck, a two-wheel inner radial truck, and driving wheels disposed between said trucks.

8. In a locomotive, the combination with a cab, of two articulated running gears, each of said running gears comprising two pairs of driving wheels, a two-wheel radial truck, and a four-wheel pivotal truck, said driving wheels having wheels larger in diameter than the diameter of the wheels on said pivotal and said radial truck.

9. In an electric locomotive for high-speed service, the combination with a truck frame, of two pairs of driving wheels associated with said frame, a jack shaft having its ends projecting between said pairs of driving wheels, rods connecting the ends of the jack shaft to the driving wheels, a pair of electric motors for propelling said jack shaft, each of said motors comprising an armature shaft having two armatures tandem-mounted thereon, and rods connecting the ends of said armature shafts to said jack shaft and connecting rods.

10. In a locomotive, the combination with a cab, of two articulated running gears for supporting said cab, each of said running gears comprising a plurality of pairs of driving wheels, motor shafts having armatures mounted in tandem thereon, and means comprising side rods for connecting said shafts to the driving wheels.

11. In a locomotive, the combination with a cab, of two articulated running gears pivotally associated with said cab, each of said running gears comprising driving wheels mounted thereon, motors having tandem-mounted armatures connected to the driving wheels, and a two-wheel and a four-wheel guiding truck mounted adjacent to said driving wheels.

12. In a locomotive, the combination with a cab, of two articulated running gears for supporting said cab, each of said running gears comprising two pairs of driving wheels, motors having tandem-mounted armatures connected to said driving wheels, and two guiding trucks mounted adjacent to said driving wheels.

13. In a locomotive, the combination with a cab, of two articulated running gears for supporting said cab, each of said running gears comprising two pairs of driving wheels having a jack shaft mounted between them, motors having tandem-mounted armatures connected to said jack shaft, and side rods for connecting the jack shaft to the driving wheels.

14. In an electric locomotive for high-speed service, the combination with a single cab, of two running-gear units upon which the cab is mounted, each of said running-gear units comprising two pairs of driving wheels, a jack shaft located between said pairs of driving wheels, rods connecting the ends of the jack shaft to the driving wheels, a pair of electric motors on each running gear unit, each of said motors comprising an armature shaft having two armatures tandem-mounted thereon, and means connecting the ends of said armature shafts to said jack shaft and connecting rods.

15. In a locomotive, the combination with a cab, of two articulated running gears connected to said cab, each of said running gears comprising two pairs of driving wheels, a jack shaft located between the pairs of driving wheels, side rods for connecting the jack shaft to the driving wheels, and motors located over the driving wheels and having tandem-mounted armatures connected to the jack shaft.

In testimony whereof we have hereunto subscribed our names this 24th day of November, 1916.

GEORGE M. EATON.
RUDOLF E. HELLMUND.

Copies of this patent may be obtained for five cents each, by addressing the "Commissioner of Patents, Washington, D. C."